L. LIGHTFOOT & J. J. HAWK.
Culinary Apparatus.
No. 197,871. Patented Dec. 4, 1877.
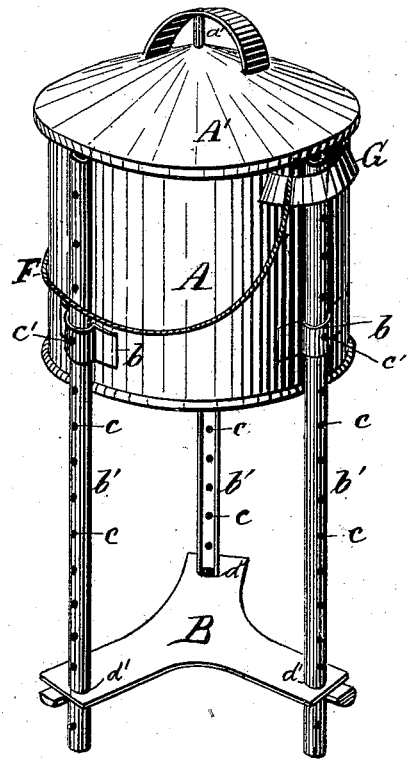
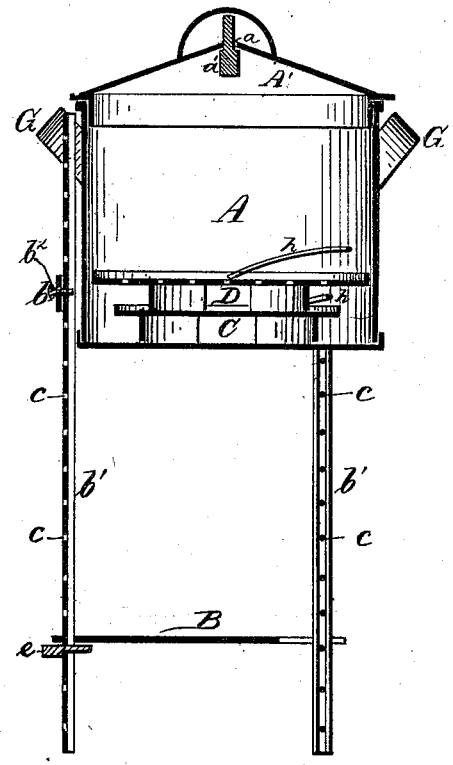
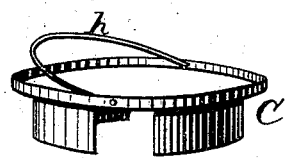
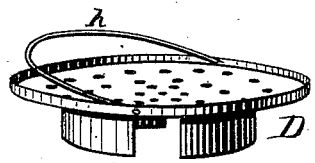
Attest:
August Petersohn.
C. H. Hansen.
Inventor:
Luke Lightfoot & John J. Hawk,
by Louis Bagger & Co.
Attorneys.

UNITED STATES PATENT OFFICE.

LUKE LIGHTFOOT AND JOHN J. HAWK, OF DOWNEY, IOWA.

IMPROVEMENT IN CULINARY APPARATUS.

Specification forming part of Letters Patent No. 197,871, dated December 4, 1877; application filed September 24, 1877.

*To all whom it may concern:*

Be it known that we, LUKE LIGHTFOOT and JOHN J. HAWK, of Downey, in the county of Cedar and State of Iowa, have invented certain new and useful Improvements in Culinary Apparatus; and we do hereby declare that the following is a full, clear, and exact description thereof, which will enable others skilled in the art to which it appertains to make and use the same, reference being had to the accompanying drawings, which form a part of this specification, and in which—

Figure 1 is a perspective view. Fig. 2 is a vertical central section; and Figs. 3 and 4 show the two detachable plates which serve as false bottoms removed.

Similar letters of reference indicate corresponding parts in all the figures.

This invention relates to certain improvements in culinary vessels; and consists, essentially, in the arrangement within the vessel of two peculiarly-constructed pans, serving as false bottoms, substantially as hereinafter more fully shown and described.

In the drawings, A is the kettle or vessel, which may be of any suitable size or shape, and made of any suitable material, having a cover, A', provided with a vent-opening, $a$, which may be closed by a plug, $a'$.

Upon the outside of the vessel are arranged a series of staples, $b\ b$, forming guides for the legs $b^1\ b^1$, which consist simply of strips of sheet-metal, bent as shown, and provided each with a series of perforations, $c$. The staples also have each a perforation, $c'$, through which a pin, $b^2$, may be inserted to hold the legs, which may thus be lengthened or shortened in position.

B is a plate, having slots $d'\ d'$, through which the legs $b^1$ may be passed, pins $e$ being inserted through the perforations of the legs under the plate, to keep the latter in position.

The vessel A is provided with two pans, serving as false bottoms C D, both having downward-projecting rims, serving as legs, in order to space them to any desired extent. The lower pan or bottom C, which is of a somewhat smaller diameter than the vessel, is imperforate; but the upper bottom, which fits loosely inside the vessel, is perforated. Plates C and D are each provided with a bail, $h$, with which to remove them from the vessel.

When using our improved culinary apparatus for cooking or steaming fruits or vegetables, the legs are not used, unless cooking over a lamp or gas-jet.

The vessel may be simply placed over a fire, with the false bottoms C D in place, and the space beneath the lower false bottom C filled with water for generating steam.

The article to be cooked or steamed is placed upon the upper or perforated pan, while the lower solid one serves to catch and retain the juice which may drip from the fruit while steaming, and thus prevent it from mixing with the water and being lost.

In cooking certain kinds of food, the lower pan or false bottom is not necessarily used, and may be left out.

By these means of cooking, the vegetables or fruits may be cooked without destroying the form of the fruit or vegetable.

Another use of our culinary apparatus—of which we claim the original right of discovery—is that of keeping yeast and dough of the proper temperature while rising, preparatory to baking, in cold weather, by means of hot air and steam, the vessel A serving as a hot-air chamber and steam-reservoir. In using it for this purpose, the vessel containing the yeast or dough is placed upon the plate or false bottom D in the vessel A, with the lower or solid false bottom left out. The vessel A is then adjusted upon the legs $b^1\ b^1$, and placed over a lamp, or any other convenient heater, the vessel A serving as a hot-air chamber, surrounding the vessel containing the yeast or dough.

When steam is desired, water is placed in the vessel A, and, being heated, generates the requisite steam.

The vessel, with the lamp resting on the plate B, adjusted to the legs, as before stated, may be suspended by the cord F, attached to its ears G, when desired.

Having thus described our invention, we claim and desire to secure by Letters Patent of the United States—

The combination, with a culinary vessel, of two pans, C D, serving as false bottoms, the lower one imperforate and the upper one perforated, substantially as and for the purpose herein shown and specified.

In testimony that we claim the foregoing as our own we have hereto affixed our signatures in presence of two witnesses.

LUKE LIGHTFOOT.
JOHN J. HAWK.

Witnesses:
CHAS. BARNS,
JOHN CORNWALL.